(12) United States Patent
Oretti (10) Patent No.: US 6,886,589 B2
(45) Date of Patent: May 3, 2005

(54) FLOAT VALVE (75) Inventor: John Earnest Oretti, Blackburn (AU)

(73) Assignees: Autogrow Pty Ltd., Victoria (AU); Aquarose Pty Ltd., Victoria (AU)

( * ) Notice: Subject to any disclaimer, the term of this patent is extended or adjusted under 35 U.S.C. 154(b) by 0 days.

(21) Appl. No.: 10/432,814

(22) PCT Filed: Nov. 27, 2001

(86) PCT No.: PCT/AU01/01538

§ 371 (c)(1),
(2), (4) Date: May 23, 2003

(87) PCT Pub. No.: WO02/42669

PCT Pub. Date: May 30, 2002

(65) Prior Publication Data

US 2004/0035466 A1 Feb. 26, 2004

(30) Foreign Application Priority Data

Nov. 27, 2000 (AU) ............................................. PR1717

(51) Int. Cl.[7] .......................... A01G 27/02; F16K 31/26; F16K 31/56
(52) U.S. Cl. .......................... 137/418; 47/40.5; 47/48.5; 47/79; 74/100.1; 74/520; 137/416; 137/422; 137/445; 137/448; 251/75; 251/280
(58) Field of Search .................................... 137/421, 422, 137/420, 448, 416, 418, 434, 445; 47/48.5, 40.5, 79; 251/75, 279, 280; 74/100.1, 520

(56) References Cited

U.S. PATENT DOCUMENTS

| 1,705,367 | A | * | 3/1929 | Kennedy ..................... 137/416 |
| 1,725,820 | A | * | 8/1929 | Mumma ...................... 137/418 |
| 2,525,014 | A | * | 10/1950 | Berge ......................... 137/418 |
| 3,459,214 | A | * | 8/1969 | Le Grady ..................... 137/420 |
| 5,230,361 | A |   | 7/1993 | Carr et al. ................... 137/416 |
| 5,426,990 | A | * | 6/1995 | Francart, Jr. .................. 251/75 |
| 5,502,924 | A | * | 4/1996 | Lee .............................. 47/79 |
| 5,671,562 | A | * | 9/1997 | Fah .............................. 47/79 |
| 5,678,600 | A | * | 10/1997 | Locke et al. ................. 137/414 |
| 5,937,574 | A | * | 8/1999 | Jacques ....................... 47/40.5 |
| 5,941,691 | A |   | 8/1999 | Stephens ..................... 417/133 |
| 6,099,260 | A | * | 8/2000 | Reynolds ..................... 417/133 |
| 6,240,954 | B1 |   | 6/2001 | Bereznai ..................... 137/312 |

OTHER PUBLICATIONS

PCT/AU98/00869 published Apr. 29, 1999 (WO 99/20100); FAH, Ah N. VIC 3173 (AU).

(Continued)

Primary Examiner—George L. Walton
(74) Attorney, Agent, or Firm—Macheledt Bales & Heidmiller LLP (57) ABSTRACT

The float valve (11) controls water level e.g. in an associated plant pot. A housing (21) has a water inlet (25) with an inlet port (26), a float (31) able to rise and fall with the level of the water in the housing (21), a valve operating mechanism (60) able to open and close the port (26), and an actuator means (40) to operate the valve operating mechanism when the float (31) rises and falls to predetermined levels. For opening and closing the inlet port (26), there is a valve operating mechanism comprising a valve operator (60) having a valve member (67) and a lever (61) mounted for pivoting movement about generally central pivot point (65). Actuator means (40) is coupled to the float (31) and switches between a standby condition an active condition respectively to the closed and open positions of the valve operating mechanism (60). The actuator means (40) comprises an over-center mechanism having an actuator (71) which is operatively associated with the valve operator (60), a float follower (41) movable in response to rising and falling of the float (31), and a spring mechanism (58) acting between force points on the float follower (41) and the actuator (71).

19 Claims, 6 Drawing Sheets

OTHER PUBLICATIONS

AU 921220–A published Aug. 27, 1992 (AU) Johnson, J.A.
AU–A–57657/94 published Sep. 29, 1994 (AU) Yumoto, Hideaki; TLV Co, Ltd.
AU–B–33000/95 published May 9, 1996 (AU) Yumoto, Hideaki; TLV Co, Ltd.
AU–B–16224/97 published Jul. 17, 1997 (AU) Yumoto, Hideaki; TLV Co, Ltd.
AU–B–16223/97 published Jul. 17, 1997 (AU) Yumoto, Hideaki; TLV Co, Ltd.
PCT/AU99/00957 published May 11, 2000 (WO 00/25572); Kaurah, Jagjitt Singh.
JP 10141589–A dated May 29, 1998 TLV Co Ltd. (paragraph translation + foreign text).
JP 10061887–A dated Mar. 6, 1998 TLV Co Ltd. (paragraph translation + foreign text).
AU 199944776 B3 (Pat. No. 720665) published Jun. 8, 2000; Turner, S.
PCT/US92/07725 published May 27, 1993 (WO 93/10350); Francart, Armand (cover pg.).
EP 0 709 607 A2 published Jan. 5, 1996 Bulletin 1996/18; Yumoto, Hideaki; TLV Co, Ltd.
PCT/AU99/00301 published Oct. 28, 1999 (WO 99/54668); Nixon, Adrian John.
GB2302916 published Aug. 24, 1999 (counterpart to U.S. Pat. 5,941,691 ** Stephens) FYI.
WO 94/04971 mentioned in the International Search Report of PCT/AU01/01538 of the instant application by the PCT IPER as simply "directed to a plant container, holding water" but not used substantively, could not be located at this time.

* cited by examiner

FLOAT VALVE

This invention relates to a float valve. It is particularly useful in a watering unit such as for plant pots or containers which are self-watering and animal water bowls, but is not limited to such use.

It is known to have plant pots with a reservoir below a base of the pot and holes in the base allowing water to feed by capillary action from the reservoir to a plant in the pot. Generally the only control of the water flow is the density of the potting mix and level of the water. This type of pot can therefore often result in excessive watering of the plants which can be harmful to plants and, conversely, can allow totally dry conditions.

It is therefore desirable to provide a self watering plant system which better regulates the amount of water available for plants in pots.

It is shown in a recently published but not commonly known patent specification WO 99/20100 to have a liquid level control device including a casing nested between two floats. A first float fits inside the casing and controls water flow through the inlet by means of a closure. The base of the casing has ports to allow water to flow into a container. The other float is affected by the level of water in the container and opens or shuts the vent by means of the closure. When the water level is low, the first float is held down by air trapped inside the casing due to the vent being closed. As the other float becomes buoyant, it rises to open the vent. The rising of the second float with the water level shuts off the water flow. When the water level falls, the other float lowers and seals the vent. If the water level continues to drop a partial vacuum is created inside the casing and maintains the water level therein. When the water level falls below the entry, air enters into the casing through breather tube and holes to relieve the partial vacuum and the first float drops and opens the inlet to restart the water filling cycle.

Generally the prior art uses several systems all based on an "air lock system" to supply water in a cyclic fashion to plants. These have drawbacks in that the required small breather holes can be blocked so that the device will not work. In addition room has to be left on top of the devices based on the air lock systems to allow a flow for movement of the float that opens the breather hole. This is not always possible. A further disadvantage of the air lock system is that the top level that the water reaches is substantially below the top of the unit, since a safety zone is required to be left vacant above it. This means that capillary action has to be very good to supply water to the plant roots above or systems have to be built so that plant roots can extend down alongside the air lock device.

In another recently published but not well known patent document WO 00/25572, there is shown another a liquid level control device. The document shows a water level control which is operated by a toggle device. The arm of the toggle device shuts off the water flow when it is straight by pressing a resilient stopper against the water inlet. When the toggle device is bent by the actuator arm, liquid is allowed to flow into the container. The toggle device has four soft integral joints that can flex repeatedly. A cover for the water control device which has a means of attaching it to the central stand as well as at least one means of attaching it to a container or vessel in which the device is to be installed. This intricate system relies on many small pieces and particularly a toggle system that may not be able to maintain continuous predictable operation over a long period as is required in plant watering systems.

It is therefore an object of the invention to provide a reliable liquid level control device suitable for use in a range of conditions including in a self watering pot.

According to the present invention there is provided a float valve for maintaining at least a minimum level of water in an associated apparatus having a float to follow the water level and a water inlet for introducing water through an inlet port into the apparatus, the float valve including:

a valve operator having an associated valve member for closing and opening the inlet port, the valve operator being movable between two operative positions comprising a closed position in which the valve member closes the inlet port and an open position in which the valve member opens the inlet port to allow water flow;

biasing means providing a biasing force to bias the valve operator towards one of its two operative positions;

a switch mechanism having actuator means coupled in use to the float and movable in response to raising and lowering of the float as changes occur in the water level, the movement of the actuator means causing it to switch between a standby condition and an active condition corresponding respectively to the closed and open positions of the valve operator, the switch mechanism being constructed and arranged so that:

the actuator means adopts its standby condition when the water level is at or above a predetermined lower level and, when in its standby condition, causes or enables the valve operator to remain in its closed position, the actuator switches over to its active condition when the water level falls to the predetermined lower level thereby causing or enabling the valve operator to adopt its open position so as to open the inlet port for entry of water into the apparatus, and the actuator means switches back to its standby condition in response to the water level rising to a predetermined upper level above the predetermined lower level, the actuator means, when switching in one direction only between its active condition and its standby condition, causing the valve operator to move against the action of the biasing force.

Preferably the biasing means biases the valve operator towards its closed position so that the actuator means, when switching from its standby condition to its active condition, causes the valve operator to move against the biasing force. The valve operator includes a lever mounted for pivoting movement about a pivot point, the lever having one arm provided with the valve member at one side of the pivot point and its other arm at the other side of the pivot point having the biasing means acting thereagainst. The actuator means can operate against the other arm so as to move that arm against the biasing force to cause the one arm to lift the valve member and open the inlet port. In this embodiment, the other arm may have a bearing surface against which the actuator means acts, the actuator means having an operative member which bears against the bearing surface, the operative member being movable between a retracted position when the actuator means is in its standby condition and an advanced position in which the valve operator lever is moved against the action of the biasing force when the actuator means switches over to its active condition.

The actuator means preferably includes an over-centre mechanism having an actuator operatively associated with the valve operator and movable between a stable standby position and an active position in which it causes the valve operator to move against the action of the biasing force, the over-centre mechanism further including a float follower coupled in use to the float and movable in response to raising and lowering of the float as the water level changes, the over-centre mechanism further including a spring mechanism acting between respective force points provided on the float follower and the actuator so that lowering of the float causes the direction of force applied by the spring mechanism on the actuator to change until the float reaches the predetermined lower level whereupon the direction of force causes the standby position of the actuator to become unstable and causes the actuator to switch over to its active position and cause the valve operator to move from its closed position to its open position.

Preferably, the direction of force applied to the actuator by the spring mechanism and transmitted by the actuator to the valve operator acts to maintain the valve operator in its open position in which the inlet port is open to water flow as the float commences to rise above its predetermined lower level after initial opening of the inlet port, the direction of force applied by the spring mechanism and acting on the actuator progressively changing as the float rises and as the float follower moves in response until the float reaches the predetermined upper level above the predetermined lower level whereupon the direction of force applied by the spring mechanism to the actuator acts to move the actuator away from its active position and back to its standby position thereby enabling the valve operator to move from its open position to its closed position under the action of the biasing means to close the inlet port.

The float follower may include an arm coupled to the float in use and pivotally mounted at a pivot point spaced from the coupling of the arm to the float, the force point of the float follower against which the spring mechanism acts being provided in proximity to the pivot point but spaced a short distance therefrom so that the force point moves as the arm pivots in response to raising and lowering of the float.

The float follower may have an associated stop member which limits the extent of movement of the float follower in the upwards direction as the float rises upon rising water level in the apparatus, the coupling of the float follower with the float thereby limiting the permitted movement of the float above the predetermined upper level even if the water level rises above the predetermined upper level.

The present invention also provides a float valve when installed in the base of a plant container, the float valve being mounted within a housing substantially closed to enclose the operative components but allowing flow of water between the housing and a reservoir provided in the base of the plant container, the reservoir providing water needed for any plant growing in the plant container and the float valve maintaining a level of water in the reservoir between predetermined lower and upper levels, the housing of the float valve providing a chamber in which a float is located and to which the actuator means is coupled.

Possible and preferred features of the present invention will now be described with particular reference to the accompanying drawings. However it is to be understood that the features illustrated in and described with reference to the drawings are not to be construed as limiting on the scope of the invention. In the drawings.

Referring to the drawings there is shown a float valve 11 comprising essentially five parts. These are a housing 21 to contain a variable level of water, a water inlet 25 with an inlet port 26 for feeding the water into the housing 21, a float 31 able to rise and fall with the level of the water in the housing 21, a valve operating mechanism 60 able to open and close the port 26 and control supply of water into the housing 21, and an actuator means 40 to operate the valve operating mechanism when the float 31 rises and falls to predetermined levels.

The housing 21 as shown in the drawings is a generally rectangular container with an open bottom that can be located in another vessel, such as a plant container, requiring control of the water level, e.g. in a reservoir provided in the base of the plant container. The housing 21 has the water inlet 25 projecting therefrom to which in use a hose or the like is connected to supply liquid to the inlet. The inlet 25 has an inlet port 26 opening into the housing at a lower portion of a side wall. The housing 21 also has an integrally moulded central post 24 which extends downwardly from the top to end adjacent the open bottom. The post 24 can be a hollow tube having a relatively small diameter.

The housing 21 defines a chamber 22 in which float 31 is located. The float 31 is a hollow generally toroidal body that fits within the chamber 22 with sufficient clearance from the walls to freely rise and fall within the chamber 22 as the water level changes. The toroidal shape defines a central opening which receives therein the post 24 so that the float can freely rise and fall guided by the post 24 to remain substantially centered within the chamber 22.

The housing 21 is formed with two parts, the first part 22 providing the main body of the housing 21 defining the chamber 12. The second part 23 (FIG. 8) provides the water inlet 25 and, on its inner sides, provides various mounting structures for the valve operating mechanism and actuator means as described later. When assembled with the main part 22, this part 23 forms portion of a side wall of the housing 21 as shown for example in FIG. 3.

Figure 4:
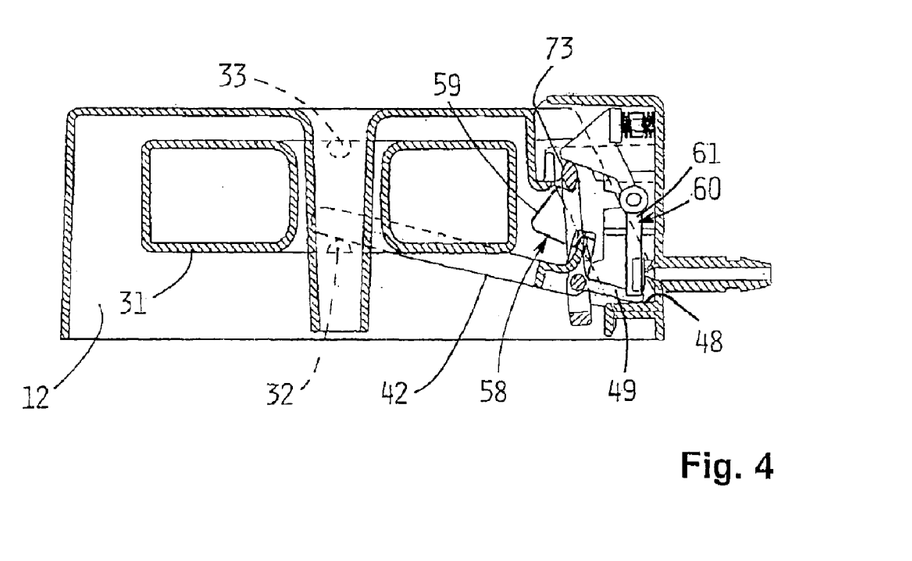
FIG. 4 is a cross section view of the float unit along III—III of FIG. 1 while in a closed condition.
Figure 5:
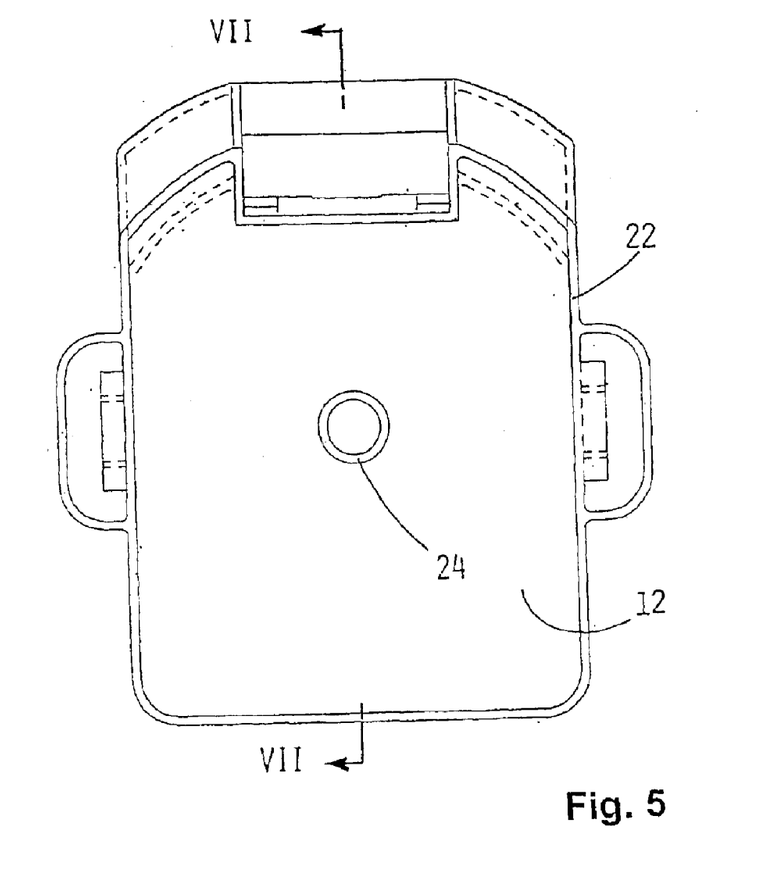
FIG. 5 is a plan view of a housing for the float valve of FIG. 1.
Figure 6:
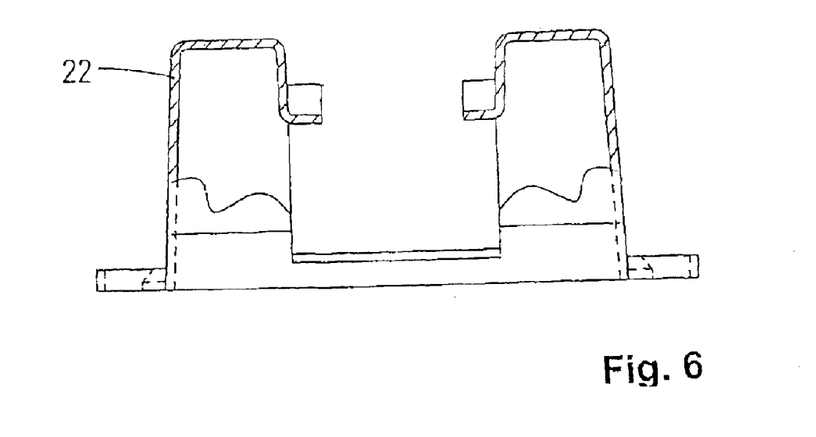
FIG. 6 is a side view of the housing of FIG. 5.
Figure 7:
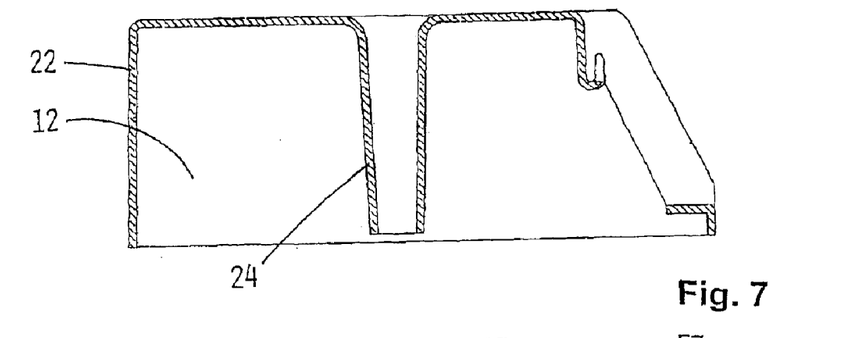
FIG. 7 is a cross sectional view of the first housing part along the line VII—VII of FIG. 5.

For opening and closing the inlet port 26, there is a valve operating mechanism comprising a valve operator 60 having an associated valve member 67 for closing and opening the inlet port 26. The valve operator 60 is movable between two operative positions, a closed position as shown in FIG. 4 in which the valve member 67 closes the port 26, and an open position in which the valve member 67 is retracted from and thereby opens the inlet port 26 to allow water flow.

Figure 8:
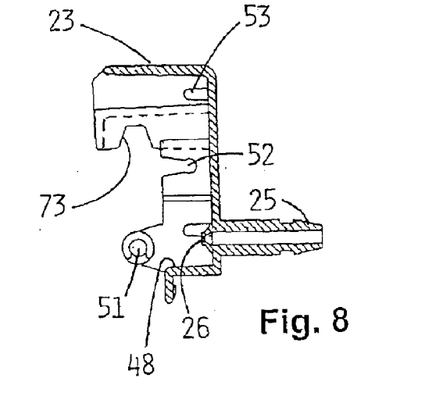
FIG. 8 is a cross sectional view of a second container part along the line VII—VII of FIG. 5.

The valve operator 60 in the drawings comprises a lever 61 mounted for pivoting movement about generally central pivot point 65 defined for example by rod shaped projections which are received within the pivot mount 52 provided by the housing part 23 (FIG. 8). The valve member 67 may comprise a pad or the like composed of a resilient material such as a synthetic or natural rubber or resilient plastics material set into or mounted on the arm 66 of the lever which extends from the pivot point 65 and overlies the inlet port 26. The other arm 62 of the lever extends in the opposite direction and has associated therewith a biasing means shown as a compression spring 54. The spring 54 is mounted on the mounting projection 53 (FIG. 8) and bears against the arm 62 providing a biasing force in a direction to pivot the lever about the pivot point 65 and apply the valve member 67 to close the inlet port 26. The arm 62 has a bearing surface 63, the function of which will be further described later.

To operate the valve operating mechanism 60, the float valve provides actuator means 40 which is coupled to the float 31 and is movable in response to raising and lowering of the float as the water level changes. The actuator means 40 switches between a standby condition (FIG. 4) and an active condition (FIG. 3) corresponding respectively to the closed and open positions of the valve operating mechanism 60.

The actuator means 40 comprises an over-centre mechanism having an actuator 71 which is operatively associated with the valve operator 60, a float follower 41 movable in response to rising and falling of the float 31, and a spring mechanism 58 acting between force points on the float follower 41 and the actuator 71.

Figure 1:
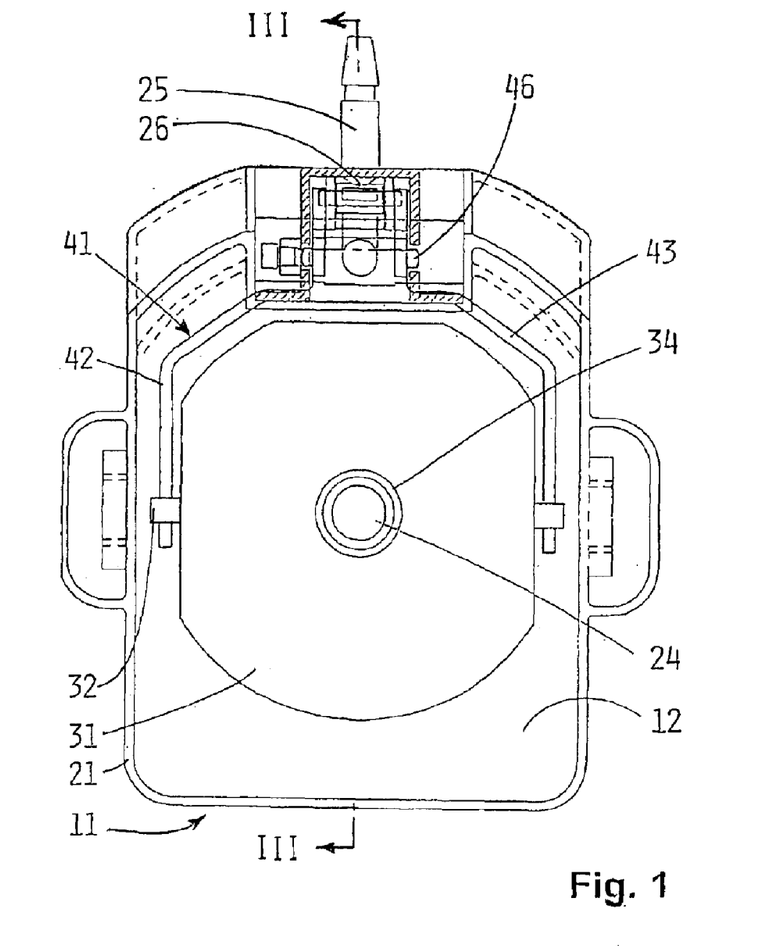
FIG. 1 is an underneath plan view, with some parts in horizontal section, of a float valve according to an embodiment of the invention.
Figure 2:
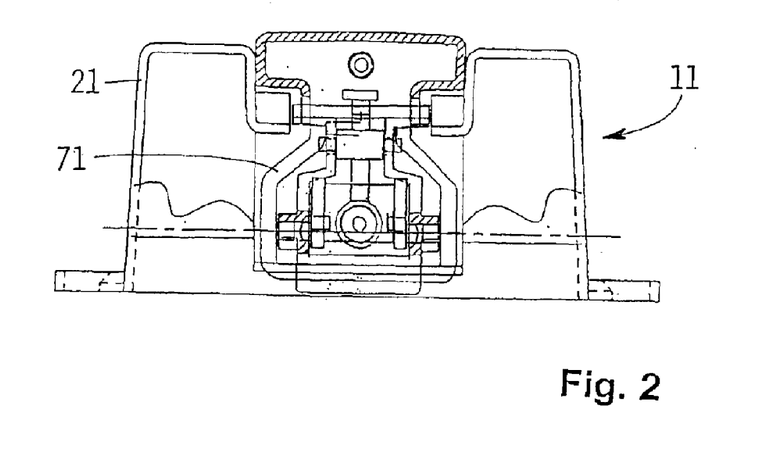
FIG. 2 is a side view, partly in cross section, of the valve in FIG. 1.
Figure 3:
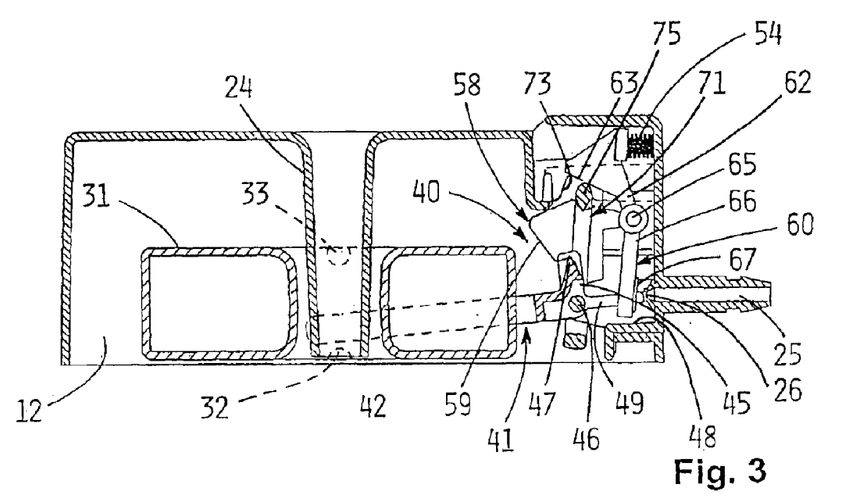
FIG. 3 is a cross section view of the float unit along the line III—III of FIG. 1 while in an open condition.
Figure 9:
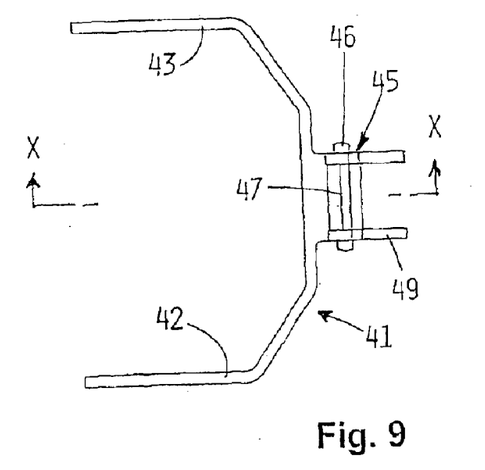
FIG. 9 is a plan view of the float follower of the float valve of FIG. 1.
Figure 10:
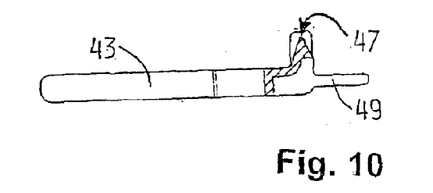
FIG. 10 is a sectional view along the line X—X in FIG. 9.
Figure 11:
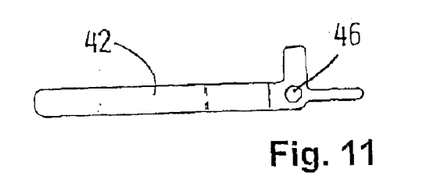
FIG. 11 is a side view of the float follower of FIG. 9.

The float follower 41, shown in FIGS. 9 to 11 is generally U-shaped and has two spaced arms 42, 43 which straddle the float 31. Where the arms 42, 43, meet at the connecting portion 45 there are pivot pins or bosses 46 which are received within the pivot mount 51 provided by the part 23 (FIG. 8) so that the float follower 41 can pivot about the pins 46 as the float 31 rises and falls. The float 31 has vertically spaced projections 32, 33 and the arms 42, 43 are located between these projections 32, 33 on each side of the float. This ensures that as the float rises from its lower level as shown in FIG. 3 while the water is entering through the inlet port, the projection 32 lifts the arms 42, 43 progressively. After the float has reached its predetermined upper level and the valve has closed, as shown in FIG. 4, and the water level progressively falls and the float also descends, there can be lost motion as the arms 42, 43 remain inclined upwardly as shown in FIG. 4 until the upper projections 33 engage with the arms 42, 43 and cause the arms to start pivoting downwardly about the pivot point 46 as the water level continues to fall.

Beyond the pivot point 46, the float follower 41 has a stop member 49 in the form of legs projecting rearwardly and which limit the extent of movement of the float follower 41 in the upwards direction as the float rises upon water level rising in the apparatus. The limitation of movement occurs because the stop member 49 will engage against the ledge 48 provided by the housing part 23. This position is shown in FIG. 4, thereby limiting the permitted movement of the float 31 above the predetermined upper level even if the water level rises above that level.

Figures 12, 13:
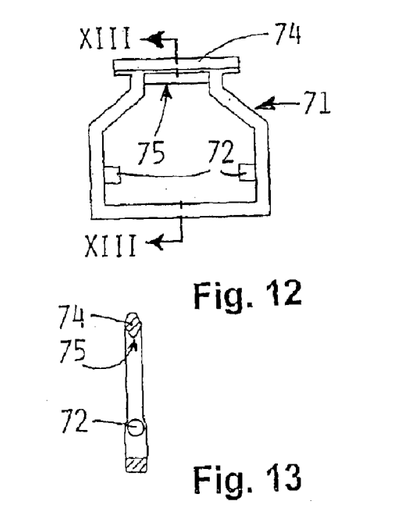
FIG. 12 is a front view of an actuator of the float valve of FIG. 1.
FIG. 13 is a cross sectional view along the line XIII—XIII in FIG. 12.

The actuator means 40 includes actuator 71. As shown in FIGS. 12 and 13, the actuator 71 has internally projecting pins 72 which engage with the pivot formations 51 provided by the housing part 23 so that the actuator 71 is also pivotally movable about the same pivot point 46 as the float follower 41. As shown in FIGS. 3 and 4, the actuator 71 is movable between a stable standby position shown in FIG. 4 determined for example by engagement with the shoulder 73 provided by the housing part 23 and best seen in FIG. 8. The actuator 71 is movable to an active position shown in FIG. 3 where it causes the valve operator 60 to move against the action of the biasing spring 54 to open the inlet port 26. To effect the movement of the valve operator 60, the actuator 71 has a transverse cross piece 74 which engages with and bears against the bearing surface 63 provided on the arm 62 of the valve operator 60. As best seen in comparing FIGS. 3 and 4, the cross member 74 bears against and travels along the bearing surface 63 as it causes the valve operator lever 61 pivot about pivot point 65.

To achieve the switching of the actuator means 40 between its standby and active conditions, the over-centre mechanism, in addition to comprising the float follower 41 and actuator 71, includes spring mechanism 58. The mechanism 58 comprises a generally V-shaped spring 59 the opposite ends of which have formations to cooperate with the float follower 41, the actuator 71. The spring 59 in use has its ends compressed towards each other and the spring acts between force point 47 provided by the float follower 41 and force point 75 provided by the cross piece 74 of the actuator 71. The point 47 provided by the float follower 41 is provided by a ridge located in the vicinity of the pivot point 46 but elevated a short distance above that pivot point so that as the float follower arms 42, 43 are raised and lowered, the point 47 shifts by relatively short distances to the right and left in the side views shown in FIGS. 3 and 4, thus shifting the point from which the reaction force is applied by the spring 59 to the force point 75 on the actuator 71 from a direction as shown in FIG. 4 tending to hold the actuator in its stable standby position towards the position shown in FIG. 3 in which the direction of force applied by the spring 59 tends to push the actuator away from its standby position. In particular, lowering of the float 31 as the water level drops until approximately the level shown in FIG. 3 is reached, causes the direction of force applied by the spring 59 to the force point 75 on the cross piece of the actuator 71 to change sufficiently to cause instability of the standby position and hence switch over of the actuator means, thus causing the valve operator lever 61 to pivot from its closed position to its open position thus opening in the port 26.

Upon the water level rising again, the force point 47 moves clockwise in the view shown in FIG. 3 as the float rises and the float follower arms 42, 43 pivot upwardly. When the arms 42, 43 reach approximately the position shown in FIG. 4, the direction of force applied by the spring 59 to the force point 75 of the cross piece 74 of the actuator 71 has shifted sufficiently to cause the actuator 71 to switch back to its stable standby position with the cross piece 74 engaged against the shoulder 73. This condition shown in FIG. 4 allows the valve operator lever 61 to pivot under the action of the spring 54 to cause the valve member 67 to close the inlet port 26.

As mentioned earlier, there can be some lost motion between the arms 42, 43 of the float follower 41 and the projections 32, 33. As the water level is depleted from a container, such as a plant container with which the float valve is being used, e.g. due to capillary watering of a plant in the container, or usage by animals if the container comprises an animal water bowl, the float 31 will move down the central post 24, leaving the arms 42, 43 located somewhere between the projections 32, 33. As the float continues downwardly due to continuing water level falls, the upper projection 33 will engage the arms 42, 43 and start to pivot them downwardly. This lost motion before the arms 42, 43 start to move downwardly ensures there is not immediate opening of the valve 67 away from the inlet port 26. The mechanism, including the over-centre mechanism 40 which provides a further delay in operation, ensures that the inlet valve opens only when the water level has fallen substantially to the bottom of the housing 11.

Modifications to the preferred embodiment described above and illustrated in the drawings are possible.

For example the housing 21 need not have a central post for locating a float in a central position. Instead the housing itself could merely retain the float therein. Further instead of a plurality of vertically spaced protrusions extending from an outer side of the float being used to engage the float follower arms, the float follower arms may include a vertically extended groove which captures a single protrusion on either side of the float and thereby provides the required lost motion.

In one particular variation of the vertical activation of the closing means the float can travel substantial distances in a vertically extended container. Instead of the follower arms being required to also travel a substantial distance, the float can be separated into a movable float and two partially movable floats. The partially movable floats are mounted near the top and bottom of the container and are connected to the over centre mechanism or the like. However the partially movable floats are shaped so as not to be sufficiently affected by the liquid level in the container such that alone they fail to operate the closing means. Instead the movable float must with its buoyancy or weight coact with the partially movable float to effect activation of the closing means. In this way the float valve of the invention can be used on any height container.

This invention can be applied to a watering unit and particularly plant pots which are self-watering. It is known to have plant pots with a substantially cylindrical shape and an open bottom and closed base and holes in or near the base that provide liquid communication with an upper reservoir allowing water to feed by capillary action from the reservoir to a plant in the pot. Generally the water flow is regulated by the density of the potting mix and level of the water in the reservoir. This type of plant pot can often result in excessive water supply to the plants.

Use of the invention in a watering unit enables a more natural watering system. In one application the float valve can be used in a watering unit able to be used for a plant held in a container, the unit comprising a platform having a bottom surface for supporting a plant and a upper structure insertable into a reservoir and able to locate a valve for regulating the supply of water to the reservoir, the top surface of the platform having recesses forming troughs which include restricted openings providing a fluid connection to the reservoir for receiving water to be absorbed by capillary action by a plant. The platform can form part of the plant container or the watering unit can be a separate unit that is inserted into the container. Preferably the valve is able to be suspended from the underside of the platform.

The watering unit can interfittingly or integrally include a reservoir which extends at least partially below the platform and provides an intermediary water storage facility for receiving water from a remote source and provides water to the troughs of the platform. The valve can provide the means for regulating the water from the remote source to the reservoir or from the reservoir to the troughs. Generally the means for sourcing the water from the remote source to the reservoir will be either a gravity feed from a higher positioned water source, a remote holding tank with a pump pumping water to the reservoir, or a pressure reducer on a remote mains pressure water supply such as a household tap to reduce the pressure of the water supply to the reservoir such as for example to between 10 to 15 pounds per square inch.

The float valve controls the opening of a water inlet to the reservoir. The valve has a mechanism preventing instantaneous opening of the valve until a low initiation water level is reached. After activation the valve remains open until a high turn off water level is reached. No further activation occurs until all the water has been used down to the low initiation water level.

Figure 14:
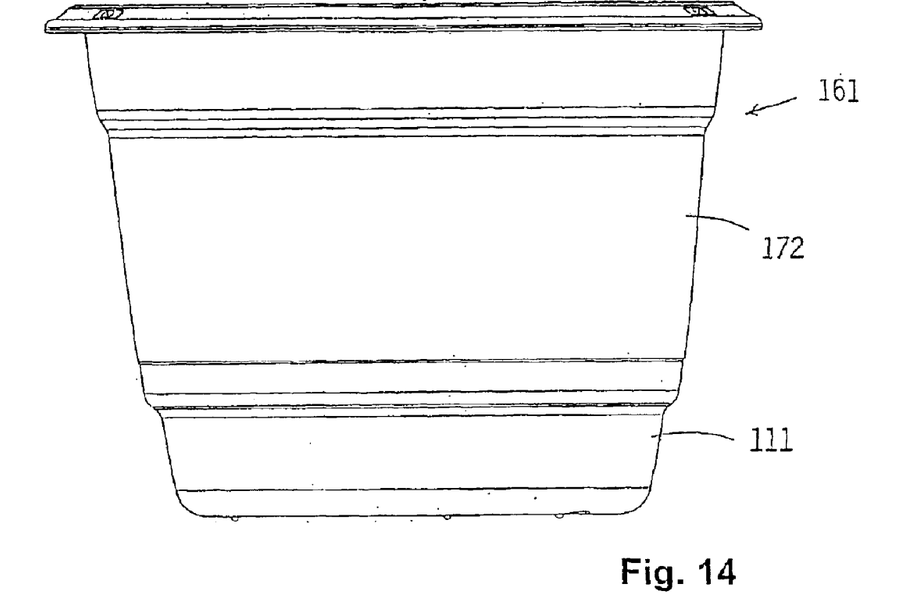
FIG. 14 is a side view of a watering unit in a plant pot using a float valve according to an embodiment of the invention.
Figure 15:
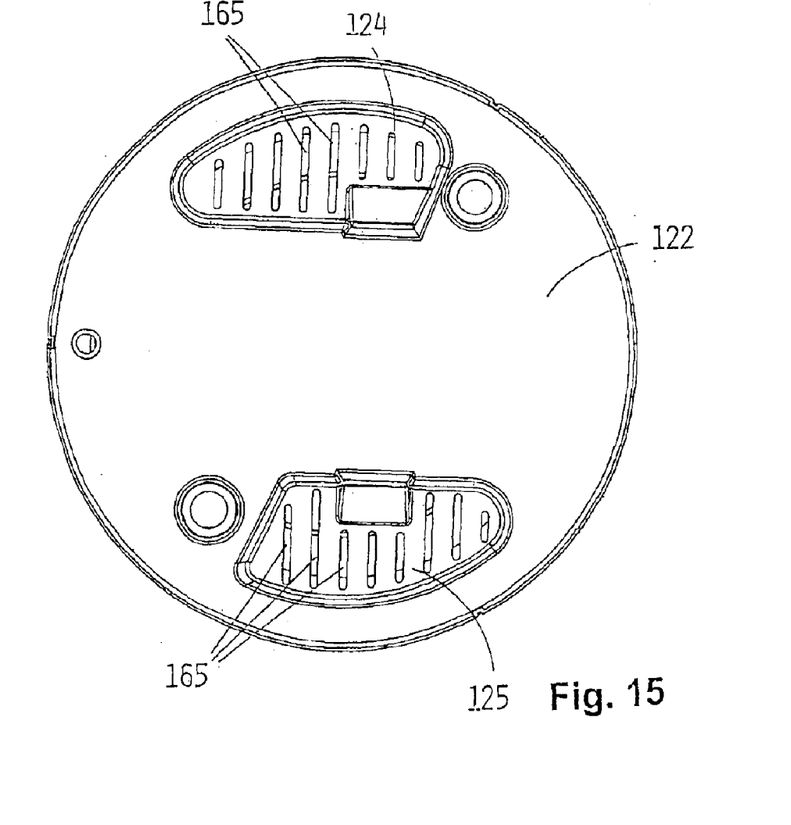
FIG. 15 is a plan view of the plant pot with watering unit of FIG. 14.
Figure 16:
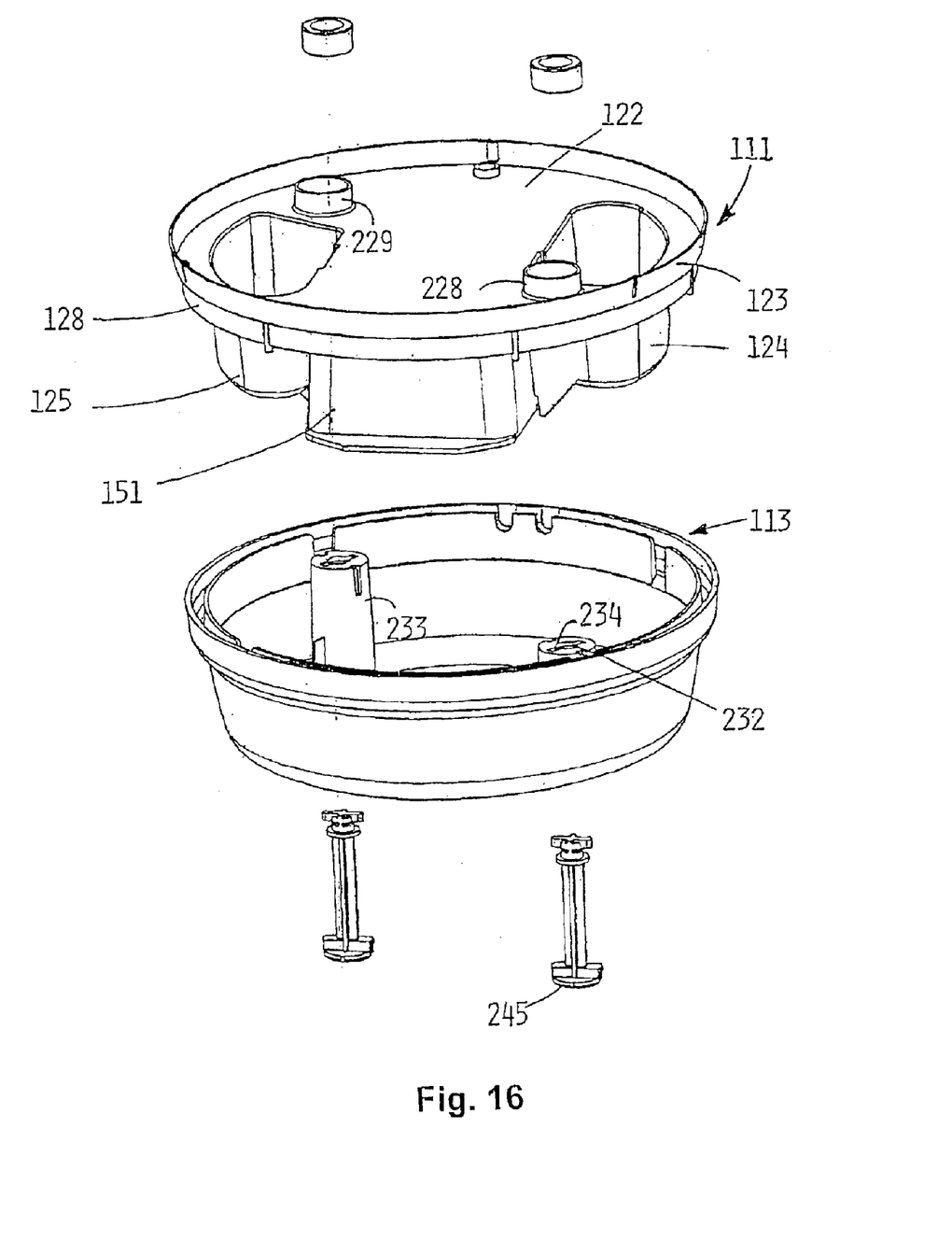
FIG. 16 is an exploded view of the base of the watering unit of FIG. 14.

Referring to FIGS. 14 to 16, the particular illustrated watering unit 111 has a platform able to support a plant and recesses in the platform 122 forming troughs 124, 125 with restricted openings 165 therein. A reservoir 113 interfits substantially below the platform 122 and fluidly connects with the troughs 124, 125, and a valve 151 according to the invention is mounted between the platform 122 and the reservoir 113 for regulating the supply of water to the reservoir 113 and the troughs 124 125, to enable a plant supported on the platform to draw water from the troughs by natural capillary action. The platform 122 has a lower structure 128 extending into the reservoir 113 and the valve 151 is suspended from the underside of the platform by the platform lower structure 128. The two parts of the watering unit 111 lock together by locking pins 245 extending through internal posts 232, 233 and engaging with locking means 228, 229 on platform 122 through keyholes 234.

The valve 151 is of the float valve type of the invention which operates with a single float and controls the opening of a water inlet on the valve 151. The inlet is connected to a tube that extends from a remote water source and through water feed opening in the top surface 122 of the platform 112. The valve in this embodiment has an over centre mechanism preventing instantaneous opening of the valve until a low initiation water level in the reservoir 113 is reached. After activation the valve 151 remains open until a high turn off water level is reached. No further activation occurs until substantially all the water has again been used and the water level is at the low initiation water level.

This delay in filling is considered a benefit in plant watering to emulate more closely a natural water cycle due to sporadic rain. Like naturally growing plants, the plants will not always have a constant level water supply as was a failure of some previous watering systems.

Further detailed descriptions of plant pots and the like incorporating a float valve to control the inflow of water are contained in Australian patent specification No. AU-11127/01 by the present applicants and the entire contents of that specification are incorporated herein by cross reference to provide disclosures of the float valve in use.

What is claimed is:

1. A float valve for maintaining at least a minimum level of water in an associated apparatus having a float to follow the water level and a water inlet for introducing water through an inlet port into the apparatus, the float valve comprising:

a valve operator having an associated valve member for closing and opening the inlet port, the valve operator being movable between two operative positions comprising a closed position in which the valve member closes the inlet port and an open position in which the valve member opens the inlet port to allow water flow;

biasing means providing a biasing force to bias the valve operator towards either one of its two operative positions;

a switch mechanism having actuator means coupled in use to the float and movable in response to raising and lowering of the float as changes occur in the water level, the movement of the actuator means causing it to switch between a standby condition and an active condition corresponding respectively to the closed and open positions of the valve operator, the switch mechanism being constructed and arranged so that:

the actuator means adopts its standby condition when the water level is at or above a predetermined lower level and, when in its standby condition, causes or enables the valve operator to remain in its closed position, the actuator switches over to its active condition when the water level falls to the predetermined lower level thereby causing or enabling the valve operator to adopt its open position so as to open the inlet port for entry of water into the container, and the actuator means switches back to its standby condition in response to the water level rising to a predetermined upper level above the predetermined lower level, the actuator means, when switching in one direction between its active condition and its standby condition, causing the valve operator to move against the action of the biasing force, wherein:

the valve operator includes a lever mounted for pivoting movement about a pivot point, the lever having one arm provided with the valve member at one side of the pivot point and its other arm at the other side of the pivot point having the biasing means acting thereagainst, the biasing means being compressed by the other arm and against an inner side of a housing structure; and said other arm has a bearing surface against which the actuator means acts by travelling along the bearing surface as the valve operator is moved between the open and closed positions.

2. A float valve as claimed in claim 1 wherein the biasing means biases the valve operator towards its closed position so that the actuator means, when switching from its standby condition to its active condition, causes the valve operator to move against the biasing force.

3. A float valve as claimed in claim 1 wherein the actuator means operates against said other arm so as to move that arm against the biasing force to cause the said one arm to lift the valve member and open the inlet port.

4. A float valve as claimed in claim 1 wherein the actuator means has an operative member which bears against the bearing surface, the operative member being movable between a retracted position when the actuator means is in its standby condition and an advanced position in which the valve operator lever is moved against the action of the biasing force when the actuator means switches over to its active condition.

5. A float valve as claimed in claim 1 wherein the actuator means includes an over-centre mechanism having an actuator operatively associated with the valve operator and movable between a stable standby position and an active position in which it causes the valve operator to move against the action of the biasing force, the over-centre mechanism further including a float follower coupled in use to the float and movable in response to raising and lowering of the float as the water level changes, the over-centre mechanism further including a spring mechanism acting between respective force points provided on the float follower and the actuator so that lowering of the float causes the direction of force applied by the spring mechanism on the actuator to change until the float reaches the predetermined lower level whereupon the direction of force causes the standby position of the actuator to become unstable and causes the actuator to switch over to its active position and cause the valve operator to move from its closed position to its open position.

6. A float valve as claimed in claim 5 wherein the direction of force applied to the actuator by the spring mechanism and transmitted by the actuator to the valve operator acts to maintain the valve operator in its open position in which the inlet port is open to water flow as the float commences to rise above its predetermined lower level after initial opening of the inlet port, the direction of force applied by the spring mechanism and acting on the actuator progressively changing as the float rises and as the float follower moves in response until the float reaches the predetermined upper level above the predetermined lower level whereupon the direction of force applied by the spring mechanism to the actuator acts to move the actuator away from its active position and back to its standby position thereby enabling the valve operator to move from its open position to its closed position under the action of the biasing means to close the inlet port.

7. A float valve as claimed in claim 5 wherein the float follower includes an arm coupled to the float in use and pivotally mounted at a pivot point spaced from the coupling of the arm to the float, the force point of the float follower against which the spring mechanism acts being provided in proximity to the pivot point but spaced a short distance therefrom so that the force point moves as the arm pivots in response to raising and lowering of the float.

8. A float valve as claimed in claim 5 wherein the float follower has an associated stop member which limits the extent of movement of the float follower in the upwards direction as the float rises upon rising water level in the apparatus, the coupling of the float follower with the float thereby limiting the permitted movement of the float above the predetermined upper level even if the water level rises above the predetermined upper level.

9. A float valve as claimed in claim 5 wherein the valve operator includes a lever mounted for pivoting movement about a pivot point, the lever having one arm provided with the valve member at one side of the pivot point and its other arm at the other side of the pivot point having the biasing means acting thereagainst.

10. A float valve as claimed in claim 9 wherein the actuator means operates against said other arm so as to move that arm against the biasing force to cause the said one arm to lift the valve member and open the inlet port.

11. A float valve as claimed in claim 10 wherein said other arm has a bearing surface against which the actuator means acts, the actuator means having an operative member which bears against the bearing surface, the operative member being movable between a retracted position when the actuator means is in its standby condition and an advanced position in which the valve operator lever is moved against the action of the biasing force when the actuator means switches over to its active condition.

12. A float valve for maintaining at least a minimum level of water in a plant container and installed in the base thereof, said float valve having a float to follow the water level and a water inlet for introducing water through an inlet port into the container, the float valve mounted within a housing substantially enclosing the operative components of the float valve, but allowing water flow between the housing and a reservoir provided in the base of the container, the float valve comprising:

a valve operator includes a lever mounted for pivoting movement about a pivot point, the lever having one arm at one side of the pivot point and its other arm at the other side of the pivot point, the valve operator having an associated valve member for closing and opening the inlet port, the valve operator being movable between two operative positions comprising a closed position in which the valve member closes the inlet port and an open position in which the valve member opens the inlet port to allow water flow into the reservoir of the plant container base;

biasing means providing a biasing force to bias the valve operator towards either one of its two operative positions;

a switch mechanism having actuator means coupled in use to the float and movable in response to raising and lowering of the float as changes occur in the water level, the movement of the actuator means causing it to switch between a standby condition and an active condition corresponding respectively to the closed and open positions of the valve operator, the switch mechanism being constructed and arranged so that:

the actuator means adopts its standby condition when the water level is at or above a predetermined lower level and, when in its standby condition, causes or enables the valve operator to remain in its closed position, the actuator switches over to its active condition when the water level falls to the predetermined lower level thereby causing or enabling the valve operator to adopt its open position so as to open the inlet port for entry of water into the container, and the actuator means switches back to its standby condition in response to the water level rising to a predetermined upper level above the predetermined lower level;

the actuator means, when switching in one direction between its active condition and its standby condition, causing the valve operator to move against the action of the biasing force, whereby the biasing means is compressed by the other arm of the lever and against an inner side of a housing structure; and the valve operator further comprising a bearing surface against which the actuator means acts by travelling along the bearing surface as the valve operator is moved between the open and closed positions.

13. A float valve as claimed in claim 12 wherein the one arm is provided with the valve member at one side of the pivot point and the other arm at the other side of the pivot point has the biasing means acting thereagainst.

14. A float valve as claimed in claim 13 wherein said other arm has the bearing surface against which the actuator means acts, the actuator means has an operative member which bears against the bearing surface, the operative member being movable between a retracted position when the actuator means is in its standby condition and an advanced position in which the valve operator lever is moved against the action of the biasing force when the actuator means switches over to its active condition.

15. A float valve as claimed in claim 12 wherein the actuator means includes an over-centre mechanism having an actuator operatively associated with the valve operator and movable between a stable standby position and an active position in which it causes the valve operator to move against the action of the biasing force, the over-centre mechanism further including a float follower coupled in use to the float and movable in response to raising and lowering of the float as the water level changes, the over-centre mechanism further including a spring mechanism acting between respective force points provided on the float follower and the actuator so that lowering of the float causes the direction of force applied by the spring mechanism on the actuator to change until the float reaches the predetermined lower level whereupon the direction of force causes the standby position of the actuator to become unstable and causes the actuator to switch over to its active position and cause the valve operator to move from its closed position to its open position.

16. A float valve as claimed in claim 15 wherein the float follower includes an arm coupled to the float in use and pivotally mounted at a pivot point spaced from the coupling of the arm to the float, the force point of the float follower against which the spring mechanism acts being provided in proximity to the pivot point but spaced a short distance therefrom so that the force point moves as the arm pivots in response to raising and lowering of the float.

17. A float valve as claimed in claim 15 wherein the float follower has an associated stop member which limits the extent of movement of the float follower in the upwards direction as the float rises upon rising water level in the apparatus, the coupling of the float follower with the float thereby limiting the permitted movement of the float above the predetermined upper level even if the water level rises above the predetermined upper level.

18. A float valve as claimed in claim 15 wherein the one arm is provided with the valve member at one side of the pivot point and the other arm at the other side of the pivot point has the biasing means acting thereagainst.

19. A float valve as claimed in claim 15 wherein the actuator means operates against said other arm so as to move that arm against the biasing force to cause the said one arm to lift the valve member and open the inlet port and said other arm has a bearing surface against which the actuator means acts, the actuator means having an operative member which bears against the bearing surface, the operative member being movable between a retracted position when the actuator means is in its standby condition and an advanced position in which the valve operator lever is moved against the action of the biasing force when the actuator means switches over to its active condition.

* * * * *